INVENTOR.
ROBERT W. DOBBIE
BY
ATTORNEY

United States Patent Office 3,264,842
Patented August 9, 1966

3,264,842
REFRIGERATING SYSTEM AND SUCTION PRESSURE RESPONSIVE THROTTLING VALVE THEREFOR
Robert W. Dobbie, Liverpool, N.Y., assignor to Ranco Incorporated, Columbus, Ohio, a corporation of Ohio
Filed Oct. 10, 1963, Ser. No. 324,159
1 Claim. (Cl. 62—217)

This invention relates to an improved refrigerating system and to a pressure responsive valve for automatically throttling the flow of refrigerant to the intake side of the compressor of a compressor-condenser-evaporator refrigerating system.

It is one object of this invention to provide throttling valve means in a compressor-condenser-evaporator type refrigerating system which automatically reduces refrigerant flow into the intake of the compressor as necessary to eliminate overloading of the compressor during periods of greater than normal suction pressure such as occur with hot gas defrosting cycles, and during starting and pull-down.

It is another object of this invention to provide a pressure responsive flow-limiting valve for connection in the suction line between the evaporator and the compressor of a refrigeration system, and which is responsive to increases in pressure in the suction line to throttle the refrigerant flow to the compressor and reduce the apparent suction pressure sensed by the compressor.

Yet another object of this invention is the provision in a compressor-condenser-evaporator refrigeration system, of throttling valve means comprising means defining a first chamber in communication with the evaporator and a second chamber in communication with the intake port of the compressor, and a valve member movable in the second chamber to and from a valve seat surrounding a port between the chambers, the valve member being operable by pressure responsive means such as an expansible bellows disposed in the first chamber and responsive to pressure increases therein to move the valve member toward the seat to effect throttling or limiting of refrigerant flow to the compressor intake upon increases in the suction pressure line to the evaporator.

As another object this invention aims to provide an improved throttle valve means of the foregoing character which is inexpensive to manufacture, reliable in use, readily calibrated for the conditions under which it will operate, and which may be conveniently mounted within the intake or suction chamber of the compressor.

The invention may be further said to reside in certain constructions and arrangements of parts by which the foregoing objects and advantages as well as others are achieved, as will become apparent from the following detailed description of a presently preferred embodiment of the invention, read in conjunction with the accompanying sheets of drawings forming a part of this specification, and in which.

Figure 1:
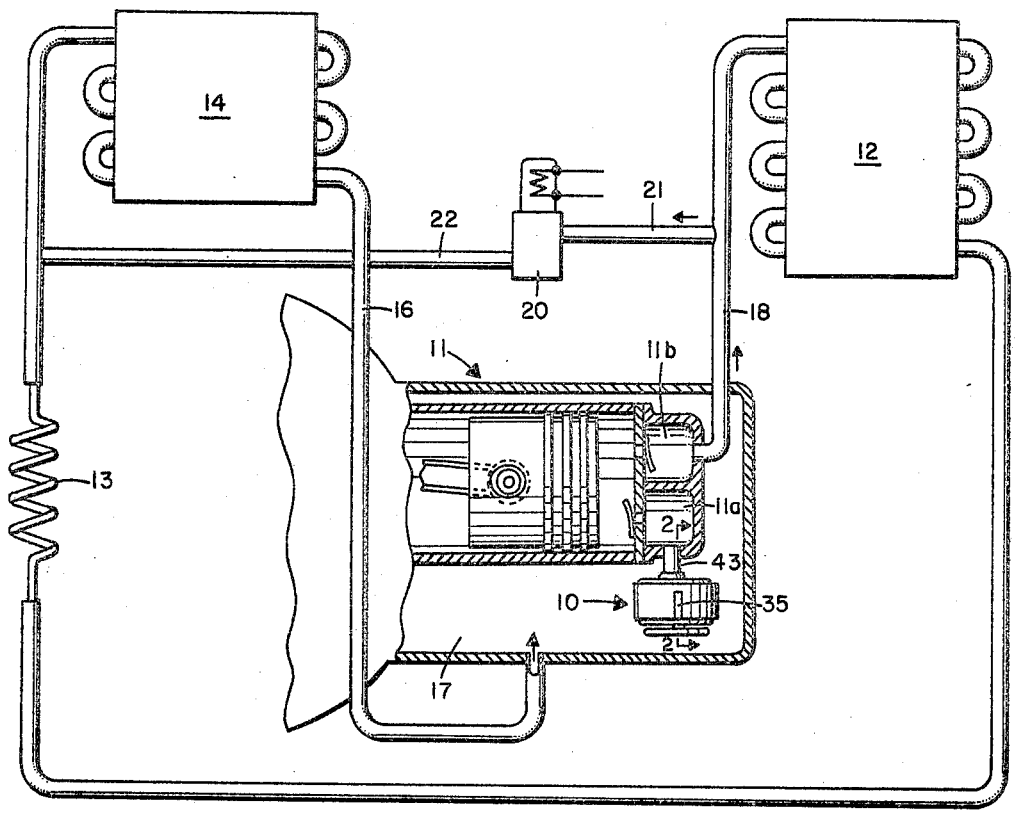
FIG. 1 is a schematic illustration of a compressor-condenser-evaporator refrigeration system including throttle valve means embodying the present invention.

Referring to FIG. 1 of the drawings, a refrigerant throttling valve 10 embodying the present invention is shown in association with an otherwise conventional compressor-condenser-evaporator refrigerating system including a compressor 11, a condenser 12, a capillary restriction 13, and an expander or evaporator 14. The compressor 11 is driven by a prime mover (not shown) such as an electric motor, automobile engine, or the like.

During normal operation of the refrigerating system the valve 10 which is described hereinafter in detail, allows free flow of refrigerant from the evaporator 14 through tube 16 and suction chamber 17 into the intake port 11a of the compressor 11 for compression and discharge through discharge port 11b and a high pressure line 18 to the condenser 12. The compressed refrigerant is cooled and condensed in the condenser 12 which transfers heat to the ambient air. The condensed refrigerant then flows through the restrictor 13 for expansion in the evaporator 14 which is cooled thereby and takes on heat from the surrounding air. The evaporator is thereby effective to cool a room or space in a manner well understood by those skilled in the art to which the invention pertains. During such normal operation of the refrigerating system the pressure in the suction line 16 to the evaporator 14 is relatively low and, because of the restrictor 13, the flow of refrigerant available to the suction side of the compressor 11 is limited and the work load of the compressor and its prime mover is correspondingly limited.

At times, however, such as during hot gas defrosting of the evaporator 14 when a solenoid valve 20 and tubes 21 and 22 provide a by-pass passage around the condenser 12 and the restriction 13, there is an increase in pressure in the suction line 16 and, in the absence of the valve means 10 of this invention, a corresponding increase in flow of refrigerant to the compressor intake resulting in overloading of the compressor and its prime mover. A similar overloading of the compressor 11 and its prime mover may occur during initial starting and "pull down" after the system has been idle and refrigerant presssures substantially equalized throughout the system.

Figure 2:
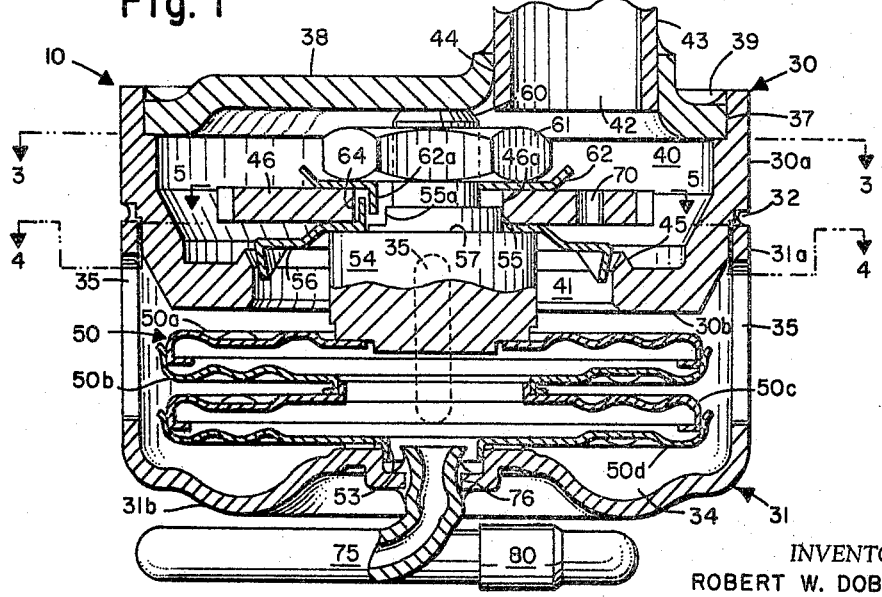
FIG. 2 is an enlarged vertical sectional view of the throttle valve means of FIG. 1 taken substantially along line 2—2 thereof.

The valve means 10 of the present invention prevents overloading of the compressor 11 and its prime mover by automatically throttling the flow of refrigerant to the compressor intake in response to increases in pressure in the suction line 16 above a certain minimum. Referring now to FIG. 2, the valve means 10 comprises a cup-shaped metal body 30 having a cylindrical side wall 30a and a bottom wall 30b. The body 30 is partially nested in a bellows cup 31, the latter being conveniently formed as a sheet metal stamping having a cylindrical wall 31a and a bottom wall 31b. The bellows cup 31 is secured about the edge of its cylindrical wall 31a to the body 30 by soldering or brazing as shown at 32. The body wall 30b and the cup 31 define a chamber 34 into which refrigerant may flow through four circumferentially spaced inlet openings 35 defined in the cylindrical wall 31a of the cup.

The edge of the cylindrical body wall 30a is relieved at 37 to receive a circular cover 38 which is secured about its periphery in fluid tight relation to the body by soldering as shown at 39. The cover 38 and the body 30 define a chamber 40 which communicates with the chamber 34 through a port 41 formed in the body wall 30b between the chambers. The chamber 40 is provided with an outlet port 42 defined by a tube 43 which is secured by brazing or the like in an opening 44 in the cover 38. The tube 43 places the chamber 40 in communication with the suction or intake passage 11a of the compressor 11.

The port 41 between the chambers 34 and 40 is surrounded by an annular valve seat 45 for a disc-like valve member 46 which is movable in the chamber 40 to and from the seat 45 to control the flow of refrigerant through the port 41 in a manner which will become apparent as the description proceeds.

The valve member 46 is positioned with respect to the seat 45 by pressure responsive means in the form of a bellows 50 which is mounted on the bottom wall 31b of the bellows cup 31. The bellows 50 comprises pairs of resiliently flexible, corrugated metal diaphragm elements 50a, 50b, and 50c, 50d, having turned edges secured together to form two hollow, expansible wafers 51 and 52. The diaphragm element 50d has a central opening defined by a neck 53 and is secured to the bottom wall 31b of the bellows cup 31, while the diaphragm element 50a carries a force transmitting bellows post 54.

Figure 3:
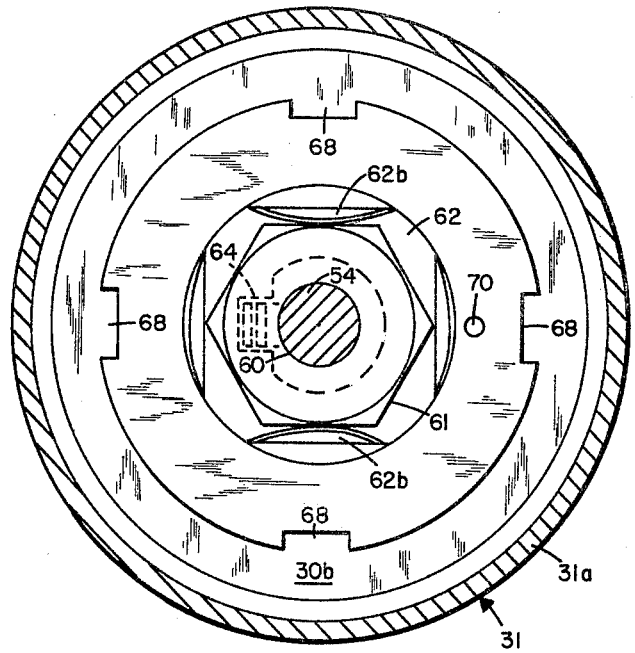
FIG. 3 is a sectional view taken substantially along line 3—3 of FIG. 2.
Figure 5:
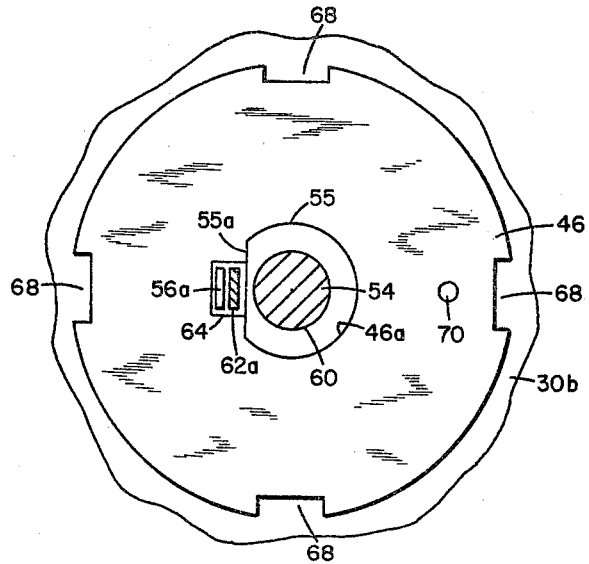
FIG. 5 is a sectional view taken substantially along line 5—5 of FIG. 2.

The bellows post 54 has a reduced portion 55 received in a central opening 46a in the valve member 46, and through a central opening of a valve guide 56 disposed between the valve member and a shoulder 57 of the bellows post. The bellows post 54 has a further reduced and threaded portion 60 on which is engaged a clamping nut 61 and lock washer 62 for securing the valve member 46 and valve guide 56 on the bellows post 54. The bellows post portion 55 has a flat side 55a in engagement with a corresponding flat side of the opening 46a in the valve member (FIGS. 2 and 5), and a keyway 64 is formed in the flat side of the opening 46a of the valve member 46. The lock washer 62 comprises a tab 62a extending downwardly into the keyway 64, and has upwardly deformed tabs 62b (FIG. 3) engaging the nut 61 to prevent loosening thereof.

Figure 4:
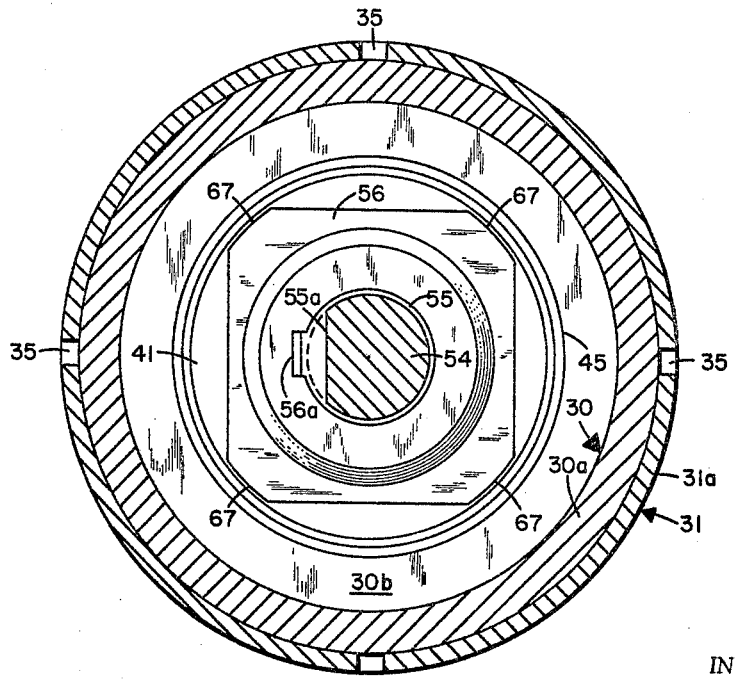
FIG. 4 is a sectional view taken substantially along line 4—4 of FIG. 2.

The valve guide 56 comprises a stamping of a sheet metal such as stainless steel and comprises a tab 56a extending inwardly into the keyway 64, as shown. The valve guide 56 is generally square in plan configuration as is best illustrated in FIG. 4, and has downturned corners 67 which cooperate with port 41 in body wall 30b to maintain the valve member 46 in registration therewith. The valve member 46 is conveniently provided with notches 68 in its periphery to accommodate a spanner wrench during tightening of the nut 61. In addition, the valve member 46 comprises a bleed opening 70, the purpose of which will be apparent as the description proceeds.

The resiliently flexible nature of the bellows 50 acts in the nature of a spring which, in this example, biases the valve member 46 toward the open position. The bellows contain a compressible gas medium, such as air, so that upon increases in pressure in the chamber as compared to chamber 40, the bellows will tend to move the valve member 46 toward its seat 45, while upon decreases of pressure in chamber 34 the bellows will tend to move the valve member away from its seat. It will be understood that the response characteristics of the valve 10 may be varied by selecting the pressure in the bellows 50 and, because pressure in the chamber 34 acts against the valve member 46 in an opening direction, the response will be in part dependent upon the relative effective areas of the valve member 46 and of the bellows 50.

In the present example, the bellows 50 has an effective area appreciably greater than the effective area of the valve member 46, and the pressure within the bellows 50 is so selected or adjusted that the valve member 46 will be moved into and out of engagement with the seat 45 at predetermined pressure differentials between the chamber 34 and the chamber 40. Stated in other words, the bellows will cause the valve member 46 to begin to open when the pressure differential by which the pressure in chamber 34 exceeds that in chamber 40 is reduced to a predetermined amount. To this end, the interior of the bellows 50 is in communication with a capillary tube 75 which is secured in an opening 76 in bellows cup wall 31b as by brazing. During calibrating of the valve 10 in the present example, the capillary tube 75 and outlet port 41 are left open to atmospheric pressure as the valve member 46 is manually depressed against its seat 45, and then the chamber 34 is subjected to a predetermined pressure difference with respect to chamber 40. Because the effective area of the bellows 50 is appreciably greater than the effective area of the valve member 46, this pressure difference will act on the bellows to hold the valve member against its seat although the manual pressure previously seating the valve member is removed. Pressure is then gradually applied to the interior of the bellows through the capillary tube 75 until the bellows causes the valve member 46 to just open. At this point, the tube 75 is sealed, as by soldering a cap 80 thereon. It will be noted that the valve member 46 is limited in movement in the opening direction by engagement of the end of the threaded portion 60 of the bellows post 54 with the cover 38.

When the valve 10 is assembled in the refrigeration system of FIG. 1, the chamber 34 and the bellows 50 are subjected to the pressure of the suction line 16 and suction chamber 17, while the chamber 40 is subjected directly to the pressure at the intake port 11a of the compressor. The circumferential spacing of the inlet openings 35 distribute the effects of gaseous refrigerant flowing into the chamber 34 so as to eliminate likelihood of buffeting of the bellows.

Figure 6:
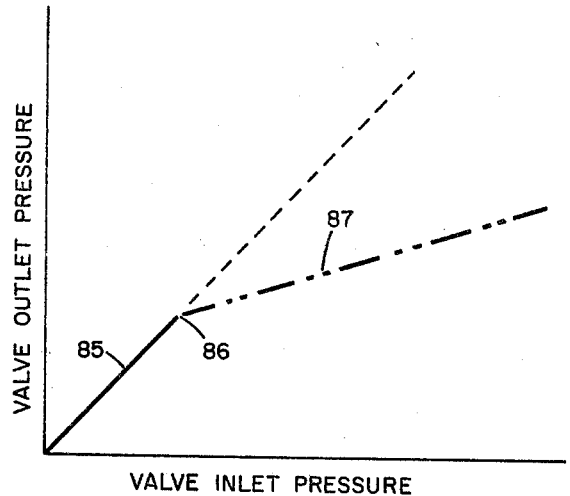
FIG. 6 is a graphic illustration of the relationship of inlet to outlet pressures of valve means embodying the invention.

Normal operation of the system will maintain a suction pressure in line 16 and chamber 34 which is less than the predetermined pressure differential with respect to chamber 40 at which the bellows will begin to move the valve member 46 toward its seat. Increases in the suction line pressure at the inlet side of valve 10 while the valve member 46 thereof is in its open position with respect to its seat 45 will be accompanied by corresponding increases in pressure at the outlet side of the valve as sensed by the compressor 11. These increases are indicated by a solid line curve 85 in FIG. 6. If the suction pressure at the inlet side of valve 10 and in the chamber 34 increases, such as during defrosting or the like, the pressure on the bellows overcomes the biasing effect thereof and the valve member 46 is progressively moved toward the seat 45, thereby throttling refrigerant flow and materially reducing the rate of pressure increase at the outlet side of the valve as indicated by the dot-and-dash line curve 87. Should the inlet pressure increase sufficiently to fully seat the valve member 46, the refrigerant flow will be limited to the bleed passage 70 which is of a size which will prevent excessive flow at the maximum pressure obtainable in the suction line 16.

By modifying the resilient biasing effect of the bellows and the relative effective areas of the bellows and valve member, embodiments of the invention may be obtained which are characterized by different response curves. For example, by making the effective area of the valve member greater than that of the bellows, the valve will never fully close but will reduce the rate at which the refrigerant flow increases with increases in suction line pressure. Obviously, the response characteristics of valves embodying the invention will depend upon the particular pressure and load requirements of the systems in which they are installed, and adaptations, modifications and substitutions of equivalents may be resorted to without departing from the spirit of the invention. Accordingly, although the invention has been described in considerable detail with reference to a specific pressure responsive throttling valve embodying the invention, it will be understood that the invention is not limited thereto, but rather the invention includes all those modifications, adaptations, substitutions, and uses as are reasonably embraced by the scope of the claim hereof.

Having described my invention, I claim:

In a refrigerating system comprising a refrigerant compressor having an inlet and a discharge, a condenser connected with said discharge of said compressor, an evaporator having its inlet connected with said condenser, said compressor having a housing enclosing said inlet thereof, said evaporator being connected with said housing for supplying refrigerant to the inlet of said compressor, a valve in said housing and comprising casing means forming a first chamber having an outlet opening in one wall and a tubular member attached to said wall in said opening, said tubular member being attached to the inlet of said compressor and supporting said valve casing means in said housing, said chamber having a valve port in a second wall thereof, said casing means forming a second chamber having a wall common with said second wall of said first chamber, an expansible sealed element supported in said second chamber on a wall thereof opposite said second wall, said element containing a relatively thermally inert gas, a valve closure member in said first chamber and adapted to close on said valve port, and means attaching said closure member to said expansible element for movement by said element to close said port, the effective area of said element subjected to external pressure being in excess of the area of said port, said second chamber having openings in the outside walls thereof for admitting refrigerant from said housing to said second chamber.

References Cited by the Examiner

UNITED STATES PATENTS

| | | | |
|---|---|---|---|
| 1,238,051 | 8/1917 | Peterson | 62—217 |
| 1,529,014 | 3/1925 | Dennedy | 62—127 X |
| 1,768,602 | 7/1930 | Hull | 62—217 X |
| 2,053,290 | 9/1936 | Kaufman | 62—217 |
| 2,071,935 | 2/1937 | Muffly | 62—217 |
| 2,215,947 | 9/1940 | Wile | 62—217 |

MEYER PERLIN, *Primary Examiner.*